United States Patent Office 3,503,739
Patented Mar. 31, 1970

3,503,739
PHOTOCONDUCTIVE LAYERS AND THEIR
APPLICATION TO ELECTROPHOTOGRAPHY
Jean-Pierre Camille Dubosc, Bernard Antony Schnuriger, and Roger Paul Gaston Thiebaut, Vincennes, France, assignors to Eastman Kodak Company, Rochester, N.Y., a corporation of New Jersey
No Drawing. Filed Jan. 3, 1966, Ser. No. 528,886
Int. Cl. G03g 5/06, 7/00
U.S. Cl. 96—1.5                                 9 Claims

ABSTRACT OF THE DISCLOSURE

Electrophotographic elements containing photoconductors comprising the macromolecular product obtained by polycondensation of a dialdehyde with either a hydrazine or a diprimary organic diamine are described.

This invention relates to novel photoconductive insulating layers containing organic polymers, to electrophotographic elements having such layers and to their use in electrophotography.

It is known that diprimary organic diamines and hydrazine can be condensed with dialdehydes to produce linear condensation polymers. Theoretically, the reaction is written $$n\text{HCO}—\text{RCHO} + n\text{H}_2\text{N}—\text{R}'—\text{NH}_2 \rightarrow$$
$$2n\text{H}_2\text{O} + \text{\{CH—R—CH=N—R'—N\}}_n$$

wherein R represents a bivalent organic radical and R' represents a bivalent radical, or a bond in the case of hydrazine.

The actual reaction is perhaps more complicated than the theoretical one shown above. Linear polymers obtained according to the theoretical reaction would be expected to be fusible and soluble in ordinary organic solvents while those actually obtained were found to be infusible or only very slightly fusible and to be insoluble or only very slightly soluble in most of the common organic solvents. This leads us to believe that secondary reactions probably cause some crosslinking between the linear chains.

We have found that the macromolecular condensation products described above have photoconductive properties in cases where the product contains carbon-to-carbon double bonds in conjugate relation with carbon-to-nitrogen double bonds and the product has a crystalline structure.

An object of the invention is to provide photoconductive insulating layers, useful in electrophotography which contain as the principal photoconductive agent a reaction product of a dialdehyde with a diprimary diamine or with hydrazine. The use of other organic photoconductors in photoconductive insulating layers for electrophotography has been described in prior art. The novel photoconductive coatings can be used and reused in electrophotographic processes involving either an electrostatic image transfer or a particulate image transfer, with recuperation of photoconductive property and reuse after transfer. They may be used in processes in which a visible image is developed finally by electroscopic particles attached imagewise to the insulating surface. Electrophotographic processes of these types are well known and are described in detail in the literature.

Photoconductive insulating layers according to this invention are characterized by the fact that they contain the macromolecular product of polycondensation of a dialdehyde and a diamine and which contains one or several carbon-to-carbon double bonds conjugated with the carbon-to-nitrogen double bond which results from condensation of the aldehyde with the amine. Generally, we have found that condensation products having a crystalline structure have better photoconductive insulating properties than do the amorphous polymers.

The diamines, (for brevity in the present text we include hydrazine in the term diamine and the word diprimary is implied in the term) and the dialdehydes useful for making our photoconductor compounds are those which form, according to the theoretical reaction stated above, a linear polymer, which contains in its structure conjugated carbon-to-carbon and carbon-to-nitrogen double bonds. The best photoconductors are those in which a continuous conjugated double bond structure extends throughout the linear structure.

Preferred dialdehydes for making macromolecular polymers are:

terephthaldehyde or para-diformylbenzene having the formula

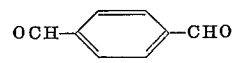

and 9,10-diformyl anthracene having the formula

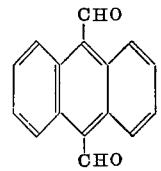

Preferred diprimary organic diamines includes:
paraphenylene diamine having the formula

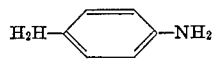

and benzidine having the formula

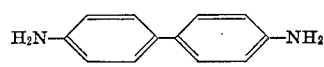

For example, condensation of paraphenylene diamine with para-diformylbenzene gives the theoretical linear structure as follows:

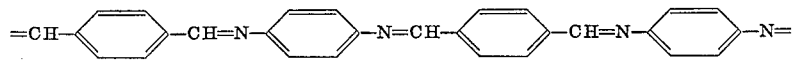

in which a conjugated series of double bonds extends the entire length of the structure. This condensation product is one of the most preferred according to the present invention.

Condensation of a dialdehyde with an amine can be easily effected by dissolving the two reagents in a solvent which forms with water an azeotrope having minimum boiling point. The mixture is refluxed and the water byproduct is recovered by a Dean and Stark collector at the head of the column.

Because the photoconductive compounds are so difficultly soluble, we prefer to prepare photoconductive insulating layers by dispersing particles of the compound in an insulating vehicle, for example an insulating resin binder, and coating the dispersion on a suitable support. An electrophotographic element so made may be used in several of the known electrophotographic processes, for example, by imposing a uniform electrostatic charge on the insulating surface in darkness and exposing the charged surface to a light pattern which discharges photoexposed areas, leaving a latent electrostatic image in unexposed areas. The latent electrostatic image may be transferred to a copy sheet on which the image is developed to a visible image by electroscopic particles. Alternatively, the latent electrostatic image on the photoconductive surface may be developed by electroscopic particles attracted imagewise to the surface and the particle image then may be transferred and fixed on a receiving surface, or the electroscopic particles may be fixed directly on the photoconductive surface. The processes just described are known in the art for use with other photoconductive insulating elements and are described in more particular detail in the literature. In some referred embodiments of the present invention we use a binder that will produce a hydrophobic surface so that atmospheric humidity will not quickly discharge the electrostatic charge. Preferred insulating binders are polystyrene, polymethyl methacrylate, coumarin-indene resins, silicone resins, polyvinyl acetate chloride, and the like. We prefer to use a proportion of binder to photoconductor in the range from about 1:1 to about 2:1 in parts by weight. To prepare a photoconductive composition for coating, we prefer to grind the photoconductive compound in a ballmill with an organic volatile liquid vehicle until a very fine dispersion is obtained, usually for at least 10 hours. Usually the binder, dissolved in an organic volatile solvent, is added during the ballmilling. Viscosity is adjusted as desired for a correct laying on of the coating. The ballmilled composition is coated on a support, then permitted to dry in the air, usually with some heating to facilitate drying. Before the coated electrophotographic element is used, it is preferable to dark adapt the element for about 24 hours, preferably at room temperature and in air of about 50–60 percent relative humidity.

Following are examples illustrating certain preferred embodiments of the invention.

PREPARATION OF COMPOUNDS (A)

(1) In a flask with two lateral tubes provided with a waterproof agitating system and a Dean and Stark decanter for the solvent, 33.5 grams of terephthaldehyde is dissolved in 700 ml. of distilled methylene chloride, protected from light. 27 grams of paraphenylene diamine are added and the mixture is heated and refluxed with agitation. After about 8 hours, 6.2 ml. of water containing some ammonia has been collected. The precipitate remaining in the decanter is filtered and dried. Thus, we obtained 46 grams of a yellow solid which becomes green in light, having no sharp melting point. The solid is only 5/100 soluble in acetone, even with the use of heat. Elementary analysis is as follows:

Calculated (percent): nitrogen, 13.5; carbon, 81.5. Found (percent): nitrogen, 12.4; carbon 72.9.

(2) By essentially the same process as that just described, 6.7 grams of terephthaldehyde was reacted with 5.4 grams of paraphenylene diamine using 300 ml. of dry xylene. After 8 hours reflux, 1.5 ml. water had been decanted. The product, after being washed in hexane and dried, weighed 9.5 grams.

(3) Into a 500 ml. flask adapted with an agitator, were introduced 1.61 grams terephthaldehyde disolved in 10 ml. tetrahydrofuran and 40 ml. acetic acid. To this yellow solution was added 1.30 grams paraphenylene diamine, previously dissolved by heating in 20 ml. acetic acid. Immediately, a yellow precipitate formed. The mixture was heated for a few seconds in a steam bath, then diluted with 400 ml. methanol, then filtered. After drying, the filtrate weighed 2.6 gm. The product is yellow ochre, only very slightly soluble in acetone and ethyl alcohol, has slightly crystalline structure as observed by X-ray diffraction.

(4) By refluxing as in 1. above, we react 26.8 grams terephthaldehyde with 10.2 ml. of 63 percent aqueous solution hydrazine, i.e., 6.4 grams hydrazine and 400 ml. methylene chloride. After 12 hours refluxing, we filter and dry a yellow precipitate weighing 26.2 grams, dry. The product is infusible and shows crystalline structure by X-ray diffraction, slightly soluble in acetone with heating. Elementary analysis is as follows: nitrogen, 16.6; carbon, 68.7.

(5) By the method of (4) above, using 3.22 grams terephthaldehyde and 0.7 gram hydrazine, we obtain again a yellow infusible solid.

(6) Into a flask having two lateral tubes adapted with an agitating system and a bromine funnel is introduced 43.° ml. of a 40 percent aqueous solution of glyoxal, i.e., 17.4 grams glyoxal. The flask is cooled with ice and salt and through the bromine funnel is added dropwise 15.4 ml. of 63 percent of hydrazine aqueous solution, i.e., 9.6 grams hydrazine. After the addition is finished, the cooling bath is removed and the mixture takes again the ambient temperature. The precipitate is filtered, washed in acetone and dried. The product is 21.7 grams of orange solid having no definite melting point, appearing amorphous by X-ray diffraction. Analysis: nitrogen, 34.5; carbon, 32.9.

(7) By the method described in (1) above, 43.5 ml. of 40 percent glyoxal aqueous solution, i.e., 17.4 grams glyoxal is reacted with 32.4 grams paraphenylene diamine in 300 ml. methylene chloride. After refluxing 16 hours, the orange precipitate is filtered and dried. The product weighs 42.7 grams. Analysis: nitrogen, 13.0; carbon 57.7. The products prepared by the above preparations were used as organic photoconductors in electrophotographic elements.

(B)

Following are examples of preferred embodiments of the invention employing these organic photoconductors.

EXAMPLE I

One gram of the insoluble product obtained in Example A is dispersed in 12.5 ml. of methyl isobutyl ketone by grinding in a ballmill for 10 hours. Then 4 ml. of a solution of 125 grams of polyvinyl acetochloride (Rhodopas AX85–15, Rhone Poulenc) in 1,000 ml. methyl isobutyl ketone is added and grinding is continued for 2 hours. A varnish is formed which is then coated on an aluminum sheet previously anodized having a thickness of 100 microns, of the type used in offset printing. When the coating has dried in air, the remaining solvent is eliminated by heating to 120° C. The finished element is then dark adapted for 24 hours at 20° C. at relative humidity about 50–60 percent. A sample of this sheet is tested as follows:

(a) The sheet is charged with a negative electrostatic surface charge in a 7,000-volt corona discharge. By means of an electrometer, the surface potential is measured and we find a 1,600-volt initial surface potential. After 3 minutes, the surface potential is measured again and the decrease in potential is only 27 percent. We have determined, therefore, that dark decay is slow enough to permit use of the sheet in electrophotographic processes.

(b) To determine the time necessary to reduce surface potential to $\frac{1}{10}$ of its initial value under light given by a 250-watt overload lamp placed in a diffusing reflector situated at 25 cm. from the photoconductive sheet (13,600 lux color temperature 3,400 K.), we find that 3.4 seconds exposure is necessary.

(c) Another sample of the sheet is sensitized with a negative charge under a 7,000-volt corona discharge by three passes. The charged element is then exposed photographically under a line image negative for 3.7 seconds to light on 13,600 lux color temperature 3,400 K. The latent electrostatic image is then developed by magnetic brush using a toner formed by mixture of $\frac{9}{10}$ epoxide resin (Araldite A10) sold by (Chemical Products) Shell-Saint-Gobain and $\frac{1}{10}$ carbon black. The toner particles have diameter less than 10 microns. Iron filings of about 250 microns degreased with methylene chloride are used as carrier particles. The toner image is fixed on the plate by heating under infrared lamp. In this way, a satisfactory image is obtained on the aluminum sheet.

EXAMPLE II

By the milling and coating operations described in Example I, we prepare a coating composition using the following ingredients:

The product of preparation (3) above—0.5 g.
Methyl isobutyl ketone—3 ml.
AX85-15 Rhotopas at 125 grams per 1,000 ml. solvent—4 ml.

An aluminum sheet was coated and tested as in Example I. Results of the test were as follows: Initial potential—170 volts. Decrease in potential after 3 minutes—30 percent. Time of exposure to produce 9/10 decay—15 seconds.

EXAMPLE III

One-half gram of the polymer product of preparation 6, above is dispersed in 8 ml. of toluene and the mixture is agitated in a glass bottle containing small stainless steel balls. After 8 hours agitation, 2 ml. of a solution containing 125 grams Rhodorsil R4220 silicone resin (Rhone Poulenc) per liter of toluene is added. Agitation is continued for 2 hours. The varnish is coated on an anodized aluminum sheet. The coating is thoroughly dried and then dark adapted as described before. A sample is then positively charged by four passes in a 10 kv. corona discharge. Results of the measurements are as follows: Initial potential—275 volts. Decrease of potential, in darkness, after 3 minutes—30 percent. Illumination needed to reduce the potential to 1/10—81,600 lux seconds. A sample of the element is exposed under a photographic negative after charging, and a latent electrostatic image is formed on the surface. The latent electrostatic image is developed by cascade development and the toner image so formed is then transferred to a sheet of paper and fixed there by infrared heating. An excellent copy of the photographic negative is obtained.

Results similar to those described in Examples I–III above were also obtained with the other polymers whose preparations are described above.

It will be understood that modifications and variations may be made within the scope of the invention as described above and as defined in the following claims.

We claim:

1. A copying element for use in electrophotography comprising a support and coated thereon a photoconductive insulating layer comprising the macromolecular product obtained by polycondensation of hydrazine with a dialdehyde, said macromolecular product having in its structure conjugated carbon-to-carbon and carbon-to-nitrogen double bonds.

2. The copying element as defined in claim 1 wherein said conjugated double bond structure extends continuously through the entire length of the polymer chain.

3. The element defined in claim 1 wherein said photoconductive insulating layer comprises the defined macromolecular polycondensation product dispersed in an electrically insulating film-forming vehicle.

4. The element defined in claim 1 wherein said dialdehyde is terephthaldehyde.

5. The element defined in claim 1 wherein said dialdehyde is p-diformyl benzene.

6. The element defined in claim 1 wherein said dialdehyde is 9,10-diformyl anthracene.

7. The element defined in claim 1 wherein said dialdehyde is glyoxal.

8. An electrophotographic process which comprises the step of composing a conductive latent photographic image on the photoconductive insulating surface of an element defined in claim 1 by imagewise photoexposure of said insulating surface.

9. In an electrophotographic process wherein an electrostatic charge pattern is formed on a photoconductive element, the improvement characterized in that said photoconductive element has a photoconductive layer comprising the macromolecular product obtained by polycondensation of hydrazine with a dialdehyde, said macromolecular product having in its structure conjugated carbon-to-carbon and carbon-to-nitrogen double bonds.

References Cited

UNITED STATES PATENTS

| | | | |
|---|---|---|---|
| 2,349,979 | 5/1944 | Moldenhauer et al. | 260—72 |
| 2,870,123 | 1/1959 | Wesp | 260—72 |
| 3,041,165 | 6/1962 | Sus et al. | 96—1.5 |
| 3,163,531 | 12/1964 | Schlesinger | 96—1.5 |
| 3,244,517 | 4/1966 | Lind | 96—1 |
| 3,373,141 | 3/1968 | Aftengut | 96—1.5 X |

OTHER REFERENCES

A.P.C. 382, 947, Bergk, published April 1943.

GEORGE F. LESMES, Primary Examiner
C. E. VAN HORN, Assistant Examiner

U.S. Cl. X.R.

96—1; 260—72, 72.5